United States Patent [19]

Kreku et al.

[11] Patent Number: 4,583,770

[45] Date of Patent: Apr. 22, 1986

[54] PIPE JOINT SEAL

[75] Inventors: Sven I. Kreku, Vindeln; Lars K. Lennartsson, Torekov, both of Sweden

[73] Assignee: Oy Wiik & Hoglund AB, Vaasa, Finland

[21] Appl. No.: 629,790

[22] PCT Filed: Nov. 3, 1983

[86] PCT No.: PCT/SE83/00379

§ 371 Date: Jul. 3, 1984

§ 102(e) Date: Jul. 3, 1984

[87] PCT Pub. No.: WO84/01807

PCT Pub. Date: May 10, 1984

[30] Foreign Application Priority Data

Nov. 4, 1982 [SE] Sweden .............................. 8206265
Jan. 31, 1983 [SE] Sweden .............................. 8300476

[51] Int. Cl.$^4$ ............................................. F16L 25/00
[52] U.S. Cl. ................................. 285/177; 285/293; 285/373
[58] Field of Search ............... 285/373, 236, DIG. 16, 285/291, 293, 177, 112

[56] References Cited

U.S. PATENT DOCUMENTS

| | | | |
|---|---|---|---|
| 863,887 | 8/1907 | Stuttle | 285/373 |
| 1,823,974 | 9/1931 | Ferguson | 285/293 |
| 2,417,741 | 3/1947 | Dillon | 285/373 |
| 3,100,658 | 8/1963 | Miller et al. | 285/293 X |
| 3,135,519 | 6/1964 | Ligon et al. | 285/291 X |
| 3,291,506 | 12/1966 | Blakeley | 285/373 X |
| 3,439,945 | 4/1969 | Chambers et al. | 285/373 |
| 3,801,141 | 4/1974 | Hollingsworth | 285/373 X |
| 3,977,705 | 8/1976 | Thiessen et al. | 285/112 |
| 4,049,298 | 9/1977 | Foti | 285/373 X |

FOREIGN PATENT DOCUMENTS

| | | | |
|---|---|---|---|
| 2315658 | 1/1977 | France | 285/236 |
| 558906 | 8/1973 | Switzerland | 285/236 |

Primary Examiner—Dave W. Arola
Attorney, Agent, or Firm—Burgess, Ryan & Wayne

[57] ABSTRACT

A pipe joint seal comprises an insert (10) adapted to be mounted around the joint and the pipe sections adjacent thereto and having in its inner side dovetailed grooves (11) or the like which are filled with a plastic sealing compound. The insert (10) can be clamped around the pipes and the joint by means of a sheet-metal union piece (21) having bent edges (22) to form a channel within which said insert (10) is mounted. When insert (10) is tightened around the pipes, the sealing compound urges the insert portions defining the dovetailed grooves (11) tightly against the pipes so that a satisfactory seal is obtained also on uneven pipe surfaces. By designing one bent longitudinal edge (22) of the union piece (21) with a height greater than that of said insert, and by causing said bent edge to engage with a groove in one of said pipes, the seal can be simply and conveniently held in nondisplaceable engagement with said pipe, while the other pipe is displaceable in the seal.

7 Claims, 7 Drawing Figures

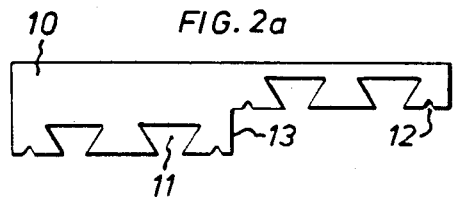
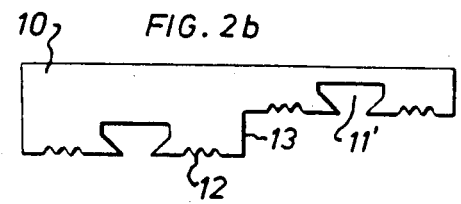
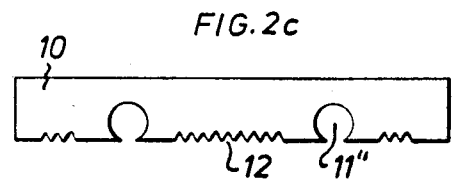
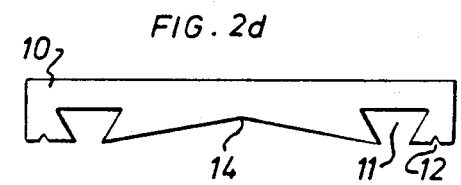
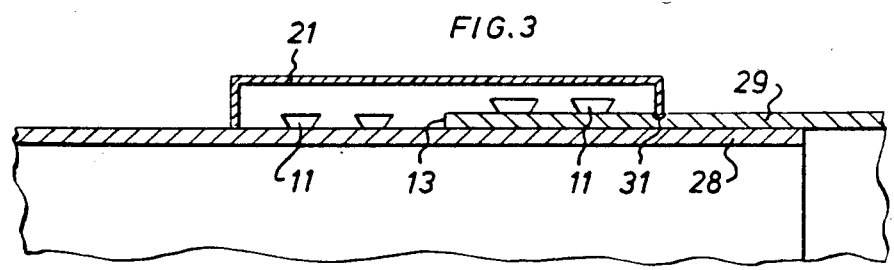

PIPE JOINT SEAL

The present invention relates to a pipe joint seal comprising an insert of elastic material, such as rubber, adapted to be mounted longitudinally around the joint and the pipe sections adjacent thereto, and a union piece of, for example, sheet metal or plastic adapted to be clamped around said insert.

Pipe conduits are supplied in pipe sections comprising a fluid-conducting pipe, an insulation around said fluid-conducting pipe, and a jacket pipe around said insulation. The fluid-conducting pipe projects at both ends of the pipe section from the insulation and the jacket pipe for welding to other pipe sections. After welding, a connection piece is pushed over the joint, and the ends of the connection piece are connected to the outer side of the jacket pipe by means of shrinkdown tubing. The space defined by the joined-together ends of the fluid-conducting pipes, the pipe insulation and the connection piece is filled with polyurethane foam which is foamed on site. In this manner, a reliable connection is established between the jacket pipe and the connection piece, but the foaming operation is detrimental to health, and one therefore aims at insulating the joint in some other manner. One solution is to provide the connection piece over the joint with a widened portion which is provided with an insulation already in the factory. As in the case mentioned above, the connection piece is pushed over the joint so that the widened portion with the insulation will lie above the point where the fluid-conducting pipes are exposed, and the connection piece is connected to the jacket pipes in the above-mentioned manner. However, a connection piece provided with a widened portion will be exposed to the axial forces which are caused by temperature variations in the pipes and which may become so great that the shrinkdown tubing succumbs. To solve this problem, the connection piece is anchored in the ground, while the jacket pipes are allowed to move freely in the connection piece. However, changes in length of up to 100 millimeters frequently occur, and it will be appreciated that a very strong and reliable seal is required at the ends of the connection piece.

It is the object of this invention to provide such a seal.

To this end, the insert mentioned by way of introduction has, in its inner side engaging the pipes, longitudinal grooves widening away from said inner side and filled with a plastic sealing compound which retains its plasticity at the prevailing temperature and pressure variations.

The invention will be described in more detail below, reference being had to the embodiments illustrated in the accompanying drawings.

FIGS. 2a–2d illustrate different embodiments of the inner side of said insert.

FIG. 3 is a sectional view of a seal connected to a joint.

Figure 1:
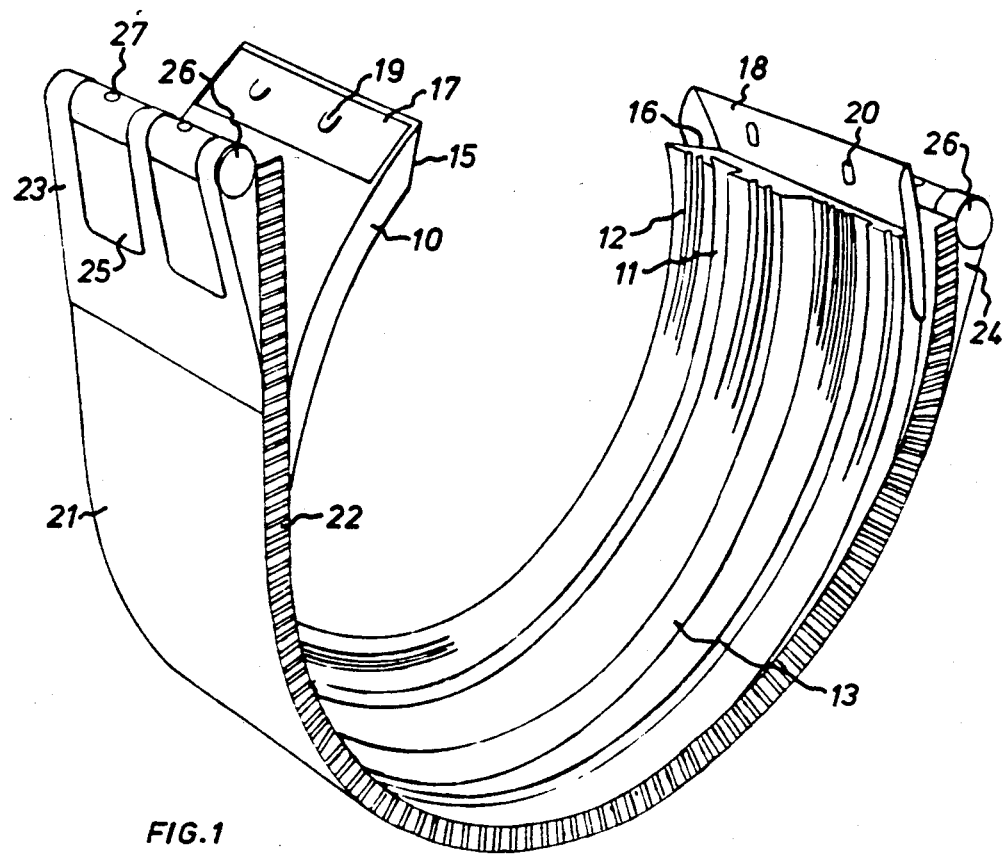
FIG. 1 is a perspective view of a seal according to the invention, comprising an insert of elastic material over which a sheet-metal union piece is provided.

The seal illustrated in FIG. 1 comprises an insert 10 of elastic material, such as rubber. The insert 10 is provided in its inner side with recesses, as is best seen from FIGS. 2a–2d. According to FIG. 2a and FIG. 2d, these recesses are in the form of dovetailed recesses which extend longitudinally of the insert and which may also have the modified form illustrated at 11' in FIG. 2b. The recesses may also be semicircular, as shown at 11" in FIG. 2c. On either side of the said recesses 11, 11' and 11", the inner side of the insert may be formed with grooves 12 forming a longitudinal fluting of a depth far shallower than that of the recesses 11, 11', 11". When the seal is used for connecting pipe sections by means of connection pieces, it is stepped on its inner side, as is shown at 13 in FIG. 2a and FIG. 2b so that it can tightly engage the outer side of both the main pipe and a connection piece pushed thereonto, as is explained in greater detail below. However, the seal according to the invention is intended to seal not only a connection piece on a pipe, but also joined-together pipes of the same diameter, in which case the insert shown in FIG. 2c and FIG. 2d should be used.

For sealing pipe joints by means of the insert 10, the insert is placed around the pipe in such a manner that the transverse edge faces 15, 16 of the seal closely engage one another. To connect these faces 15, 16 as reliably as possible to one another, they are cut obliquely, as is shown in FIG. 1, such that the face 15 forms an obtuse angle with the inner side of the insert 10, while the face 16 forms an acute angle with said inner side. It is also important that these transverse edge faces firmly engage one another, and to this end a sheet-metal member 17 is secured to the outer side of the insert adjacent the edge face 15. Tabs 19 are punched from the sheet-metal member. At the opposite end of the insert 10 another sheet-metal member 18 is secured to the outer side of the insert, and a portion of this member projects from the transverse edge face 16. Openings 20 are provided in this projecting portion, and it appears that the ends can be interconnected by urging the projecting portion of the sheet-metal member 18 over the sheet-metal member 17 until the tabs 19 hook into the openings 20. To facilitate connection of these two ends, the longitudinal edges of the sheet metal member 18 preferably are bent down over the longitudinal side edge faces of the insert 10 to form a guide channel.

The grooves 11, 11', 11" of the insert 10 are filled in the factory with a sealing compound of such consistency that is does not harden or change its properties when subjected to pressure or high temperatures, or comes into contact with water.

Figure 4:
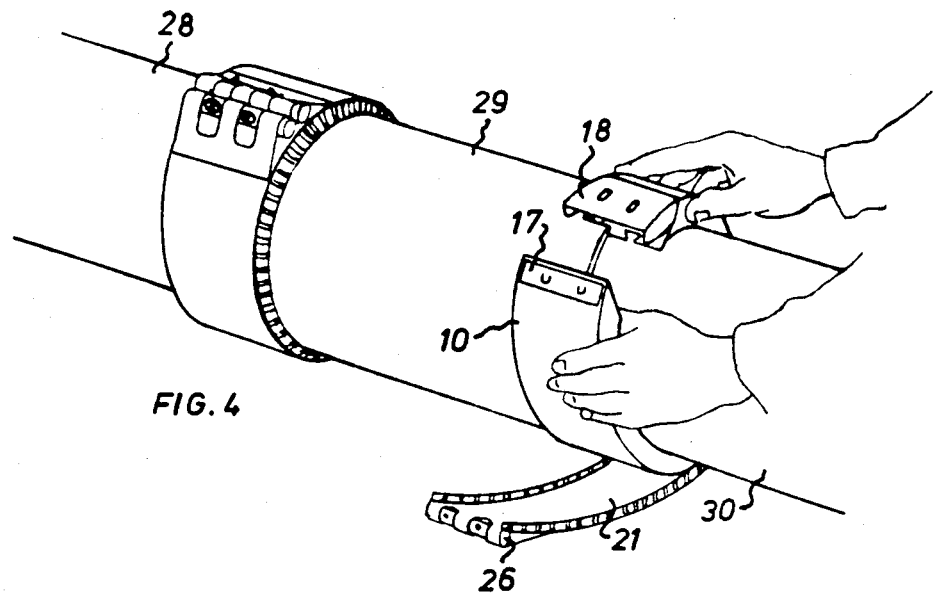
FIG. 4 is a sectional view showing how the seal is mounted.

The insert 10 is adapted to be clamped around the joint, and to this end use is made of a sheet-metal union piece 21, the longitudinal edges 22 of which are bent at right angles, as shown in FIG. 1 and FIG. 4, to form a channel adapted to accommodate the insert 10. The transverse end portions 23 and 24 of the union piece 21 are bent and secured to the outer side of the union piece 21 at a distance from the end thereof to form at each end of said union piece a loop-shaped portion in which a pin 26 is inserted. The bent portion of the union piece has cut-away portions 25 through which transverse holes extending through the pin 26 are accessible. As will appear from FIG. 4, bolts are pushed through the openings 27 and clamped in order to tighten the union piece 21 around the insert 10.

FIG. 3 illustrates how the seal is used for sealing the joint between a main pipe 28 and a connection piece 29 lying on the outside thereof. In this instance, use is made of an insert whose inner side has the appearance shown in FIG. 2a, such that the step 13 of the insert engages the end face of the connection piece, and the insert portion of thinner wall thickness engages the outer side of the connection piece 29, while the insert portion of greater wall thickness engages the outer side of the pipe 28. On assembly, the insert is first snapped together in the manner ilustrated in FIG. 4, whereupon the union piece 21 is clamped around the insert by means of the bolts extending through the openings 27. The appearance of the finished seal is shown farthest to the left in FIG. 4. When the insert is clamped around the pipe 28 and the connection piece, the sealing compound in the dovetailed grooves 11 is subjected to pressure via the material of the insert 10 and, in its turn, exerts pressure upon the lips defining the dovetailed grooves, which are tightly pressed against the periphery of the pipe 28 and the connection piece 29, respectively. In this manner, a very good seal is obtained, also if the outer periphery of the pipes should be uneven.

In a seal clamped in this manner, the pipe 28 and the connection 29 are free to move relative to one another. Occasionally, however, it may be desirable that only the pipe 28 is free to move relative to the seal, and this is readily accomplished by simply giving one of the bent edges 22 of the union piece 21 a height exceeding the thickness of the insert, and by forming a circumferential groove 31 in the outer periphery of the connection piece. On assembly, the end portion of this edge is placed in the groove 31 in which it is firmly anchored when the union piece is clamped around the insert 10. Upon subsequent movements of the pipe 28, the pipe will slide in the seal which is maintained stationary relative to the connection piece 29. If movability is desired in one direction only, for instance away from the adjacent end of the connection piece 29, the groove 31 may be replaced by a bead on the outer side of said connection piece.

The seal according to the invention may be used for all types of pipes and is especially suitable for sealing the joint between a connection piece 29 and a pipe which is inserted therein and is moving longitudinally when used. However, the seal according to the invention can be used also for sealing other types of joints, for instance joints of pipes having the same diameter, in which case the insert should have the appearance shown in FIG. 2c and FIG. 2d. The fluting provided on the inner side of the insert 10 by means of the grooves 12 is intended primarily to prevent gravel and other minor particles from entering between the insert and the pipe.

The insert illustrated in FIG. 1 is intended for a pipe having a predetermined diameter, but may be used also for a pipe having a diameter which is two, three or several times greater than the diameter of the first pipe, by interconnection of two or more inserts 10 by means of the connection elements 17, 18. It is, of course, also possible to design the union piece 21 to fit such large diameter pipes. In the embodiment illustrated, union and connection pieces are made of sheet-metal, but plastic or other suitable materials may, of course, also be used.

As has been shown above, the present invention affords a simple and reliable seal for pipe joints, also in case the outer side of the pipe or the connection piece should have been scratched or be uneven. The seal also facilitates storage and transport in that insert and union piece can both be stored in their planar state.

We claim:

1. A motion-absorbing pipe joint seal comprising:
an insert,
said insert being made of elastic material and adapted to be circumferentially placed around the pipe joint and the pipe sections adjacent thereto, with transverse edge faces of said insert engaging one another,
a union piece,
said union piece being adapted to be clamped around said insert placed around the pipe joint,
means on the inner side of said insert for engaging with the pipe sections, said means defining recesses extending longitudinally along said insert and widening in a direction away from the inner side of said insert,
and a plastic sealing compound within said recesses,
said sealing compound retaining its plasticity at prevailing temperature and pressure variations.

2. A seal according to claim 1, wherein the transverse edge faces of said insert, which are adapted to engage with one another, are bevelled such that one transverse face forms an acute angle and the other face an obtuse angle with the inner side of said insert.

3. A seal according to claim 1, comprising connection elements secured to the outer side of said insert in conjunction with said transverse edge faces and adapted to be snapped together to hold said transverse edge faces in engagement with one another.

4. A seal according to claim 3, wherein one connection element has punched-out tabs and is secured adjacent one end edge of said insert, and another connection element being fixed to the other end edge of said insert so that a portion of said element projects from said other end edge, said projecting portion having openings in which said punched-out tabs are insertable and lockable.

5. A seal according to claim 1, wherein the inner side of said insert is stepped for tight engagement with pipes of different diameters.

6. A seal according to claim 1, wherein the transverse edge faces of said union piece have clamping means by which said union piece is clampable around said insert.

7. A seal as claimed in claim 6, wherein the union piece adapted to be clamped around said insert has bent longitudinal edges to form a channel for accommodating said insert, one bent longitudinal edge of said union piece having a height exceeding the height of the insert mounted in said union piece, to engage with a groove of one of the pipes to be joined together when said union piece and said insert are clamped around said pipe.

* * * * *